June 11, 1963 E. G. WAGNER ETAL 3,093,814
TAG MEMORY
Filed April 29, 1959
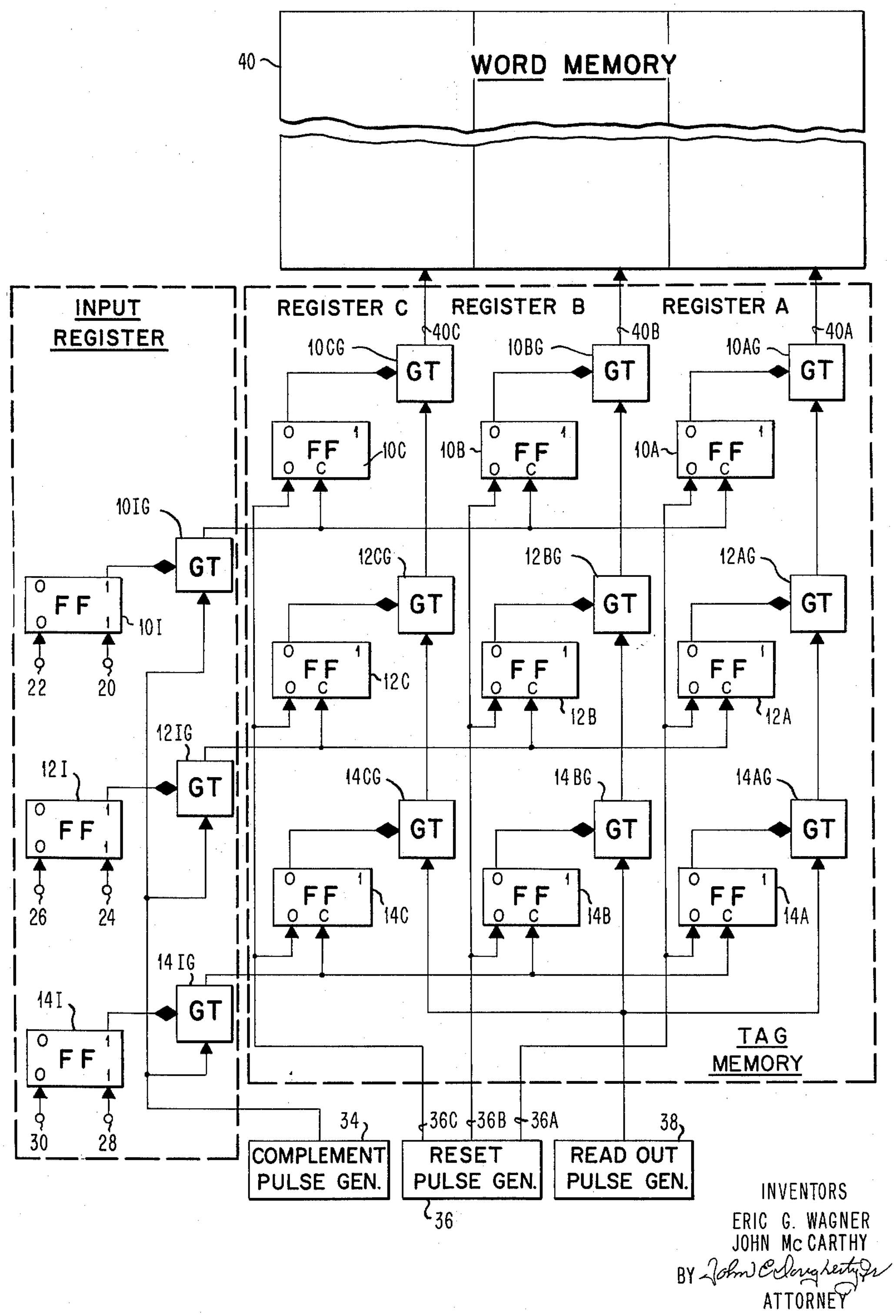
INVENTORS
ERIC G. WAGNER
JOHN McCARTHY
BY John C. Dougherty Jr
ATTORNEY United States Patent Office 3,093,814

Patented June 11, 1963

3,093,814
TAG MEMORY

Eric G. Wagner, New York, N.Y., and John McCarthy, Cambridge, Mass., assignors to International Business Machines Corporation, New York, N.Y., a corporation of New York Filed Apr. 29, 1959, Ser. No. 809,808
7 Claims. (Cl. 340—172.5)

The present invention is related to memory circuits and more particularly to a tag memory usable in catalog and/or associative memory systems.

Catalog and associative memory systems may be generally described as systems which include a word memory in which information words are stored and a tag memory in which tags for the information words are stored. These memories are interrogated by interrogating the tag memory with a particular tag so that the information word identified by that tag is read out of the word memory. Memory systems of this type begin to assume a large degree of importance with the advent of extremely small and inexpensive superconductor switching devices which render it economically feasible to employ rather large numbers of switching devices in order to achieve the advantages in flexibility and speed inherent in catalog and associative memory systems. Examples of superconductor memory systems of this type are found in copending application, Serial No. 744,157, filed June 24, 1958, in behalf of H. Heath and assigned to the assignee of the present invention.

In accordance with the principles of the present invention there is provided a novel and improved memory system and, more specifically, a tag memory for a catalog or associative memory system, which requires a minimum number of components and which may be fabricated using more conventional type switching devices such as electronic flip flops, as well as with solid state devices such as cores and transistors and the more recently developed superconductor switching devices. The tag memory, for this improved memory system, as is shown in the illustrative embodiment of the invention, disclosed herein, includes a number of tag registers. Each of these tag registers is made up of a plurality of bistable storage devices. The memory also includes an input register which is made up of a plurality of bistable input devices. The outputs for the bistable input devices are coupled to complement inputs of the bistable devices in the tag registers so that groups of these tag register devices can be complemented under the control of the data stored in the input register. With this arrangement, a tag, which is entered in the input register, may be entered in any one of the tag registers by first complementing each of the tag registers in accordance with the tag stored in the input register, then resetting the storage devices in the particular tag register in which the tag is to be stored, and then again complementing all the tag registers in accordance with the tag in the input register. This type of read in operation is shown in copending application, Serial No. 545,431, filed November 7, 1955, now Pat. No. 3,003,137 in behalf of H. Kurkjian et al. and assigned to the assignee of the subject application. However, in accordance with the principles of the subject invention, a similar operation utilizing to a large degree the same components and devices may be employed to compare the tag in the input register simultaneously with all of the tags stored in the tag registers. This comparison operation is similar to the above described read in operation in that the tag registers are complemented and later recomplemented in accordance with the tag stored in the input register. The simultaneous comparison is achieved by applying a read out signal to the output circuits for all the tag registers between the two complementing operations with an output being realized only for he particular one of the tag registers which is storing a tag which compares with the tag entered in the input register. Copending application, Serial No. 542,-545, filed October 25, 1952, now Pat. No. 2,959,768, and assigned to the assignee of the subject application discloses the basic principles of this method of comparing as applied to a single register.

Therefore, it is an object of the present invention to provide economical memory systems of the associative type and, more specifically, a novel tag memory for use in such a system.

Another object is to provide a system of this type wherein a tag entered in an input register may be either entered in any one of the tag registers or compared simultaneously with the tags stored in the tag registers.

Still another object is to provide an improved memory which employs a novel mode of operation to effect a simultaneous comparison of an information word with a number of information words stored in a like number of different registers.

Still another object is to provide a tag memory having provision for repeatedly complementing the tags stored in the memory in accordance with a tag stored in an input register wherein the tag in the input register may be compared with the stored tags by applying signals to the tag register output circuits between successive complementing actions or may be stored in a particular one of the tag registers by clearing that register between successive complementing actions.

These and other objects of the invention will be pointed out in the following description and claims and illustrated in the accompanying drawings, which disclose, by way of example, the principle of the invention and the best mode, which has been contemplated of applying that principle.

In the drawing:

FIG. 1 is a schematic representation of an associative memory system and shows in detail only the components for the tag memory used in the system.

Since the circuit components in themselves to form no part of the present invention they are represented by block diagrams. Examples of specific circuitry for the component can be found in well known computer text books such as Digital Computer Components and Circuits by R. K. Richards (1958), page 73. It should be clearly understood, however, that the present invention may be fabricated using any of the known technologies such as vacuum tubes, transistors, cryoelectric circuitry, etc. The tag memory shown includes a number of flip flop devices each of which is represented by a block FF, a like number of gating devices each represented by a block GT, and three pulse sources represented by blocks within each of which the function it performs is indicated. In the upper portion of the figure there is shown a larger block which represents the word memory in which there are stored words associated with the tags stored in the tag memory.

The tag memory itself includes three vertical columns of flip flops. Each column of flip flops constitutes a tag register and these registers are designated register A, register B, and register C. A further column of three flip flops serves as an input register for the tag memory. Each of these flip flop devices is bistable, that is, is capable of being caused to assume two different stable states and, as is usual in binary systems, each flip flop stores a binary one when in one of these states and a binary zero in the other of these states. Each of the flip flops in the tag registers of the tag memory, that is flip flops 10A, 12A, and 14A in register A, flip flops 10B, 12B and 14B in register B and flip flops 10C, 12C, and 14C in register C, is what is usually termed a complementary flip flop. By this it is meant that the flip flop may be complemented, that is switched from the state it is in to its other stable state in response to an input applied at a complement input for the flip flop. The complement input for each of these triggers is designated by the letter "C" and is located at the center of the lower portion of the block diagram for the flip flop. In the schematic diagram of FIG. 1, shaded half diamonds and full diamonds are used to illustrate the inputs to the various components represented by the blocks with the former symbol representing a pulse input and the latter representing a D.C. or continuously applied input. Thus, the complement inputs for the flip flops in the A, B, and C registers are, as indicated, pulse inputs which are applied in a manner which will be explained in detail as the description progresses. Each of the flip flops in registers A, B, and C is also provided with a second pulse input which is located at the lower left of each of these blocks. This input is what may be termed a clear or reset input in that a pulse, applied to this input of any one of the flip flops, sets that flip flop in its binary zero state, and, for this reason, the numeral "0" is shown in the lower left hand corner of each of the flip flop blocks adjacent the half diamond symbol sepsesenting the reset input to that flip flop. The flip flops in the A, B, and C registers of the tag memory may include binary one or set inputs which are effective when pulsed to set the triggers in their binary one states but, since these inputs are not required in the mode of operation herein disclosed, they are not shown.

The three flip flops which form the input register are designated 10I, 12I, and 14I and each of these flip flops is provided with a reset or binary zero ("0") input and a set or binary one ("1") input at the lower left and right sections, respectively, of the blocks representing the flip flops. These flip flops may also include complement inputs but since no complementing action is required of these flip flops for the mode of operations here described, no such inputs are shown for flip flops 10I, 12I, and 14I.

Each of the flip flops represented by a block FF has associated therewith one of the gates represented by a block GT. These gates are controlled by the flip flops and each is identified with the same designation as is used to identify the flip flop by which it is controlled, with the letter G appended. Each of these gates receives its control input from either a binary zero ("0") or binary one ("1") output of the associated flip flop. These outputs are shown at the top of the left and right sections of the blocks which represent the flip flops and each of the flip flops may have both binary one and binary zero outputs. However, since both outputs are not required for the mode of operation here produced, the flip flops in the A, B, and C registers are shown to have only binary zero outputs and those in the input register only binary one outputs. The construction of each of the flip flops is such that, when it is in its binary one state, its binary one output line is at a particular D.C. voltage level, here termed plus, and the binary zero output is at a different D.C. voltage level, here termed minus, with the terms plus and minus being merely relative. Secondly, when any one of the flip flops is in a binary zero state, its binary zero output is plus and its binary one output is minus. The binary one outputs of flip flops 10I, 12I, and 14I of the input register are applied as D.C. inputs to the associated gates 10IG, 12IG, and 14IG, respectively, the inputs being represented by the full shaded diamonds at the left side of each of these blocks. The input for each of these gates is applied at the bottom of the block GT representing it and the output is shown at the top of the block. The design of the gates is such that each is effective to prevent a pulse applied at its input from producing a pulse at its output unless the D.C. level at its control input applied by the associated flip flop is plus. Thus, each of the gates 10IG, 12IG, and 14IG are open, that is, effective to pass pulse from its input to its output only when the one of the flip flops 10I, 12I, or 14I by which it is controlled is in a binary one state. Similarly, each of the gates associated with the flip flops in the A, B, and C registers of the memory are either open or closed according to the state of the flip flop by which it is controlled and, since each of these gates is controlled by the binary zero output of the associated flip flop, each is open to pass pulses from its input to its output only when the associated one of the register flip flops by which it is controlled is in its binary zero state.

In operation, a three order tag is stored in each of the A, B, and C registers of the tag memory. The actual read in operation is the same as is shown and described in the above mentioned co-pending application, Serial No. 545,431, now Pat. No. 3,003,137. The tag to be entered in the memory is first placed in the input register by applying pulses to appropriate ones of three sets of binary one and binary zero input terminals 20, 22, 24, 26, 28, and 30 which are connected to flip flops 10I, 12I, and 14I. For example, if a tag of "101" is to be entered, input pulses are applied to terminals 20, 26, and 28 to set flip flops 10I and 14I in their binary one state and flip flop 12I in its binary zero state. As a result, gates 10IG and 14IG are open and gate 12IG is closed. Then a complement pulse is applied by a complement pulse generator 34. This pulse is directed as an input to each of the gates 14IG, 12IG and 10IG associated with the flip flops of the input register so that output pulses appear at the outputs of the gates 10IG and 14IG. The output of gate 10IG is connected to the complement input for each of the flip flops in the upper horizontal row of the register and the output of gate 14IG is connected to the complement input for each of the flip flops in the lower horizontal row of the register. Each of the flip flops 10C, 10B, and 10A and 14C, 14B, and 14A, is therefore complemented, that is switched from the binary state that it is in to the opposite binary state. It is immaterial whether or not there is any information stored in the registers of the tag memory when a read in operation is initiated since, as will become apparent as the description progresses, the tag placed in the input register may be selectively entered into any one of the tag registers regardless of the original state of that register without disturbing information stored in the other registers. Thus, each of the input flip flops 10I, 12I, and 14I is coupled through its output gate to the complement inputs of a group of flip flops in an associated row of the memory so that, when a pulse is applied by complement pulse generator 34, each of the flip flops in any one of these rows coupled to one of these input flip flops which is in its binary one state is complemented.

The second step in the read in operation is to actuate reset pulse generator 36 to apply a pulse to one of three output lines 36C, 36B, or 36A according to whether the tag in the input register is to be entered into register C, register B, or register A of the tag memory. Consider, for example, that the tag is to be entered into register C and, therefore, source 36 applies a pulse to line 36C. This pulse is applied to the zero input of the flip flops 10C, 12C, and 14C so that each of these flip flops is then reset to its zero state.

The third step in the read in operation is to actuate pulse generator 34 to again apply a pulse to gates 10IG, 12IG, and 14IG and, as above, with flip flops 10I and 14I in the binary one state and flip flop 12I in the binary zero state, this causes a pulse to be directed to the complement inputs of the flip flops in the upper and lower horizontal rows of the tag memory. Thus, flip flops 10C and 14C, which were reset to their zero state by the pulse applied by reset generator to line 36C, are complemented from their zero to their one state while flip flop 12C remains in its reset or zero state and the tag "101" is, therefore, entered in register C of the tag memory. Flip flops 10B, 10A, and 14B and 14A are also complemented in response to this second pulse applied by pulse generator 34. Since these flip flops were also complemented by the first pulse applied by this generator and did not receive a reset pulse, they are now returned to their original state. Flip flops 12B and 12A did not receive any pulses from either source 34 or 36 during the above described operation and, therefore, remain in their initial state. At the end of the operation, the tag "101" is stored in register C and registers A and B each still retain the tags initially stored therein.

The above described read in operation may be repeated to read new tags into any one of the three registers of the tag memory. During each of these read in operations, a word corresponding to the tag may be simultaneously entered into a corresponding column of the word memory 40, which is shown in block form above the tag memory. Thereafter, the memory may be interrogated by searching the tag memory for particular tags and, when a particular tag is found in the tag memory, to read out the word stored in the word memory corresponding to that tag. For example, let it be assumed that, after the read in operations, the tags "101," "111," and "010" are stared in registers C, B, and A respectively, of the tag memory and a word corresponding to each of these tags in a corresponding column of the word memory 40. Assume, further, that it is desired to interrogate the memory to determine if the tag "010" is present in the tag memory and, if so, to read out of the word memory the word associated with this tag.

The first step in this interrogation operation is to enter the interrogation tag "010" into the input register by applying pulses to terminals 22, 24, and 30 so that flip flops 10I and 14I are set in the binary zero state and flip flop 12I in the binary one state. When the interrogation tag has been entered into the input register, each of the tag registers of the memory may be simultaneously interrogated for this tag by first actuating complement pulse generator 34, then actuating a read out pulse generator 38 and then, as in the read in operation, again actuating the pulse generator 34. The first pulse applied by the complement pulse generator complements all the flip flops in any row of the tag memory for which the corresponding flip flop in the input register is in the binary one state. Since only flip flop 12I is in a binary one state, only the flip flops in the middle row of the tag memory, that is flip flops 12C, 12B, and 12A, are complemented. As a result of this complementing operation, registers C, B, and A, which initially stored tags "101," "111" and "010" now store "111," "101," and "000," respectively. Since the gates associated with the flip flops in the tag registers are controlled by the zero outputs of these flip flops, each of the gates 10AG, 12AG, and 14AG in register A of the tag memory is open while at least one of the gates in each of the other registers is closed. A read out pulse is now applied to each register and this pulse passes through gates 14AG, 12AG, and 10AG of register A to an output line 40A connected to the last named gate. This output line for the tag memory serves as an input to the word memory and controls the reading out of the word memory the word associated with the tag "010" for which the tag memory was interrogated and which was stored in register A of the tag memory. The read out pulse generator also applies a pulse to the gates for tag registers B and C. The read out pulse is blocked in register C since each of the flip flops 10C, 12C, and 14C is in the binary one state and gates 10CG, 12CG, and 14CG are, therefore, closed. The read out pulse is blocked in register B since flip flops 10B and 14B are in their binary one state and gates 10BG and 14BG are closed. Therefore, no pulse appears on either of the output lines 40C or 40B and only the word associated with the tag stored in register A is read out of the word memory.

The final step in the interrogation operation is to again actuate source 34 to apply a complement pulse to the inputs of the gates 10IG, 12IG, and 14IG and through the open gate 12IG to the complement inputs of flip flops 12C, 12B, and 12A. These flip flops are complemented so that the flip flops in the register are again storing tag "101" in register C, tag "111" in register B, and tag "010" in register A. The tag for which the register is interrogated is restored in register A since the circuit is designed for operation with a word memory which is read out of non-destructively so that the memory may be interrogated repeatedly.

It should be apparent that it is only when the tag in a particular one of the registers in the tag memory compares exactly with the interrogation tag which is entered in the input register, that all of the flip flops in an entire tag register will be in their binary zero state after the first complementing operation to allow a pulse from generator 38 to reach the output line associated with that column and thereby cause the word associated with that tag to be read out of the word memory 40. In all other cases where all of the values in the tag stored in a particular tag register do not compare exactly with the corresponding values of the interrogation tag, one or more of the gates associated with the flip flops in that tag register will be closed when the read out pulse is applied by pulse generator 38 and, therefore, the word in the word memory which is associated with that tag will not be read out. Thus, for example, when the tag memory is interrogated for a tag "011," with only the above mentioned tags "101," "111," and "010" stored therein, none of the output lines 40A, 40B, and 40C receives a pulse from pulse generator 38 and no word is read out of the word memory.

Thus, it can be seen that the read in operation and the interrogation operation each includes four steps with the first, second, and fourth steps in each operation being the same and the same structure is employed to carry out these steps in each operation. First, the tag, which is to be either entered into the tag memory or used as an interrogation tag, is entered into the input register. Second, a pulse is provided by pulse generator 34 to complement the flip flops in each horizontal row of the tag memory for which the binary value in the corresponding one of the flip flops in the input register is one. Third, either the generator 38 supplies a pulse to the gates associated with the flip flops in all the registers of the tag memory to simultaneously effect a comparison of the tag in the input register with each of the tags in the tag memory; or a pulse is applied to one of the lines 36C, 36B, or 36A by pulse generator 36 to reset to zero all of the flip flops in the particular register of the tag memory into which the tag stored in the input register is to be entered. Fourth and finally, the complement pulse generator 34 applies a pulse which resets previously complemented flip flops to their original condition and, in the case of a read in operation, by this complementing enters the tag stored in the input register into the tag register which was cleared during the third step by a pulse supplied by pulse generator 36.

It should be noted that, though the tag memory system herein disclosed by way of illustrating the principles of the invention, provides for the storage of only three tags each of which includes only three orders of information, it will be obvious to those skilled in the art that the principles of the invention may be applied in constructing tag memories on a much larger scale, both as to the number of tags which can be stored and the number of orders of information included in each tag.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A memory circuit comprising; a plurality of tag registers each including a plurality of bistable storage devices; each of said storage devices being capable of assuming a first stable state representative of a binary one and a second stable state representative of a binary zero; each of said storage devices in said tag registers having a reset input, a complement input, and output means; a pulse applied to the reset input of any one of said storage devices in said tag registers being effective to set that device in said second stable state; a pulse applied to the complement input of any one of said storage devices in said tag registers being effective to complement that storage device by switching it from the one of said binary states it is in to the other of said binary states; the output means for each of said storage devices in said tag registers being responsive in accordance with the stable state of the device; the output means for the storage devices in each said tag register being connected in an output circuit for that tag register; the output circuit for each of said tag registers being effective to provide an output in response to a pulse applied thereto only when all of the storage devices in that tag register are in said second stable state; an input register including a plurality of storage devices each having an output means and each capable of assuming a first stable state representative of a binary one and a second stable state representative of a binary zero; the output means of each of said storage devices in said input register being coupled to the complement input of each of a corresponding group of said storage devices in said tag registers with each said group including one storage device in each of said tag registers; the output means of each of said storage devices in said input register being responsive according to the state of the device whereby, when a pulse is applied to the output means of any one of these storage devices, the storage devices in the corresponding group in the tag registers are complemented only when that storage device in the input register to whose input means the pulse is applied is in said first stable state; means for entering a tag in said input register; and pulse generator means for said memory; said pulse generator means being effective when the tag entered in said input register is to be entered into a particular one of said tag registers to first apply a pulse to each of said output means for said storage devices in said input register, to then apply a pulse to the first input for each of said storage devices in the particular tag register into which the tag is to be entered, and to then again apply a pulse to each of said output means for said storage devices in said input register; said pulse generator means being effective when the tag entered in said input register is to be simultaneously compared with tags stored in each of said tag registers to first apply a pulse to each of said output means for said storage devices in said input register, to then simultaneously apply a pulse to each of the tag register output circuits; and to then again apply a pulse to each of said output means for said storage devices in said input register.

2. A memory circuit comprising; a plurality of tag registers each including a plurality of storage devices; each of said storage devices being capable of assuming a plurality of different stable information representing states; each of said storage devices in said tag registers having a first input, a second input, and output means; a signal applied to the first input of any one of said storage devices in said tag registers being effective to set that device in a particular one of said stable states; a signal applied to the second input of any one of said storage devices in said tag register being effective to switch that storage device from the information representing state it is in to another information representing state; the output means of each of said storage devices in said tag registers being responsive in accordance with the stable state of the device; the output means for the storage devices in each said tag register being connected in an output circuit for that tag register;

the output circuits for each of said tag registers being effective to provide an output in response to a pulse applied thereto only when all of the storage devices in that tag register are in a particular one of said stable states; an input register including a plurality of storage devices each having an output means and each capable of assuming a plurality of different stable information representing states; the output means of each of said storage devices in said input register being coupled to the second input of each of a corresponding group of said storage devices in said tag registers with each said group including one storage device in each of said tag registers; the output means of each of said storage devices in said input register being responsive according to the state of the device, whereby, when a signal is applied to the output means of any one of these storage devices, the storage devices in the corresponding group in the tag registers are complemented only when the storage device in the input register to whose output means the signal is applied is in a particular one of said stable states; means for entering a tag in said input register; and signal means for said memory; said signal means being effective, when the tag entered in said input register is to be entered into a particular one of said tag registers, to first apply a signal to each of said output means for said storage devices in said input register, to then apply a signal to the first input for each of said storage devices in the particular tag register into which the tag is to be entered, and to then again apply a signal to each of said output means for said storage devices in said input register; said signal means being effective when the tag entered in said input register is to be simultaneously compared with tags stored in each of said tag registers to first apply a signal to each of said output means for said storage devices in said input register, to then simultaneously apply a signal to each of said tag register output circuits, and to then again apply a signal to each of said output means for said storage devices in said input register.

3. A memory circuit comprising: a plurality of tag registers each including a plurality of bistable storage devices; each of said storage devices being capable of assuming at least first and second different stable information representing states; each of said storage devices in said tag registers having a reset input, a complement input, and output means; the output means for the storage devices in each of said tag registers being connected in an output circuit for that tag register; an input register including a plurality of storage devices each having an output means and each capable of assuming at least first and second different stable information representing states; the output means of each of said storage devices in said input register being coupled to the complement input of each of a corresponding group of said storage devices with each said group including only one storage device in each of said tag registers; and signal means coupled to said circuit including first means coupled to said complement inputs of said storage devices in said tag registers through said output means of said storage devices in said input register for causing signals to be applied to said complement input of said storage devices in said tag registers in accordance with the tag entered in said input register, second means coupled to each of said tag register output circuits for simultaneously applying a signal to each of said tag register output circuits, and third means coupled to said reset inputs of said storage devices in said tag registers for selectively applying signals to the reset inputs of all of the storage devices in any particular one of said tag registers.

4. A memory circuit comprising; a plurality of tag registers each including a plurality of bistable storage devices; each of said bistable storage devices having a reset input, a complement input, and output means; the output means for the storage devices in each said tag register being connected in an output circuit for that tag register; an input register including a plurality of input bistable storage devices each having an output means coupled to the complement inputs of a corresponding group of said bistable storage devices in said tag registers; means for entering tags in said input register; and means for storing tags entered in said input register in said tag registers and for comparing tags entered in said input register with tags stored in said tag registers comprising first signal applying means coupled to said output means of said input storage devices, second signal applying means coupled to said tag register output circuits, and third signal means coupled to said reset inputs of said storage devices in said tag registers.

5. A memory circuit comprising; a plurality of tag registers each including a plurality of bistable storage devices; each of said devices being capable of assuming at least first and second different stable information representing states; each of said storage devices in said tag registers having input and output means; a signal applied to the input means of any one of said storage devices in said tag register being effective to complement that storage device by switching it from the information representing state it is in to a complementary information representing state; the output means of each of said storage devices in said tag registers being responsive in accordance with the stable state of the device; the output means for the storage devices in each tag register being connected to form an output circuit for that tag register; said output circuit for each of said tag registers being effective to provide an output in response to a signal applied thereto only when all of the storage devices in that tag register are in a particular one of said stable states; an input register including a plurality of storage devices each having an output means and each capable of assuming at least first and second difference stable information representing states; the output means of each of said storage devices in said input register being coupled to the input means of each of a corresponding group of said storage devices in said tag registers with each said group including one storage device in each of said tag registers; the output means of each of said storage devices in said input register being responsive according to the state of the device whereby, when a signal is applied to the output means of any one of these storage devices, the storage devices in the corresponding group in the tag registers are complemented only when that storage device in the input register to whose output means the signal is applied is in a particular one of said stable states; and signal means for said memory; said signal means being effective to cause a tag entered in said input register to be simultaneously compared with tags stored in each of said tag registers by first applying a signal to each of said output means for said storage devices in said input register, then simultaneously applying a signal to each of said tag register output circuits, and then applying a signal to each of said output means for said storage devices in said input register.

6. A memory circuit comprising; a plurality of tag registers; each of said tag registers including at least first order and second order storage devices for storing first and second orders of a tag; each of said storage devices including a complement input means and an output means; the output means for the storage devices in each said tag register being connected in an output circuit for that tag register; an input register including at least first and second storage devices for storing first and second orders of a tag which is to be simultaneously compared with the first and second orders of tags stored in each of said tag registers; means for applying signals to said complement inputs of said storage devices in said tag registers under control of the storage devices in said input register whereby a signal is applied or not applied to the complement input means of all of said first order storage devices in said tag registers in accordance with the value stored in said first order storage device in said input register and a signal is applied or not applied to the complement input means of all of said second order storage devices in said tag registers in accordance with the value stored in the second order storage device in said input register; and means for thereafter simultaneously applying a signal to each of said tag register output circuits whereby an output indicative of a comparison is produced only on the output circuit for a tag register which stored the same tag as is stored in the input register.

7. A memory circuit comprising; a word memory; a plurality of inputs for said word memory; a tag memory; said tag memory including a plurality of registers; each of said registers including first, second, and third order storage devices for storing binary values of first, second, and third orders of information words; each of said storage devices being capable of assuming a first stable state representative of a first binary value and a second stable state representative of a second binary value; each of said storage devices having a complement input; each of said storage devices including an output; each of said outputs being effective to produce an output in response to a signal applied thereto when the storage device is in said first stable state and being ineffective to produce an output in response to a signal applied thereto when the storage device is in said second stable state; the outputs for the storage devices in each said register being connected in series in an output circuit for that register; each of said register output circuits being connected to a corresponding one of said inputs for said word memory and each being effective to produce an output in response to a signal applied thereto only when the storage devices for all of the outputs connected therein are in said first stable state; and means for simultaneously comparing an interrogation information word with the information word stored in each of said registers comprising signal means for applying signals to the complementary inputs of said first, second, and third order storage devices only when the value of the corresponding order of said interrogation word is said second binary value and thereafter simultaneously applying a signal to each of said register output circuits.

References Cited in the file of this patent

UNITED STATES PATENTS 2,960,681 Bonn ---------------- Nov. 15, 1960

OTHER REFERENCES

Publication, "Rectifier Networks for Multiposition Switching," Brown, Proceedings of the I.R.E., February 1949, pp. 139–147.